(12) United States Patent
Smalley et al.

(10) Patent No.: US 7,125,502 B2
(45) Date of Patent: Oct. 24, 2006

(54) FIBERS OF ALIGNED SINGLE-WALL CARBON NANOTUBES AND PROCESS FOR MAKING THE SAME

(75) Inventors: Richard E. Smalley, Houston, TX (US); Rajesh Kumar Saini, Houston, TX (US); Ramesh Sivarajan, Houston, TX (US); Robert H. Hauge, Houston, TX (US); Virginia Angelica Davis, Webster, TX (US); Matteo Pasquali, Houston, TX (US); Lars Martin Ericson, Houston, TX (US)

(73) Assignee: William Marsh Rice University, Houston, TX (US)

( * ) Notice: Subject to any disclaimer, the term of this patent is extended or adjusted under 35 U.S.C. 154(b) by 715 days.

(21) Appl. No.: 10/189,129

(22) Filed: Jul. 2, 2002

(65) Prior Publication Data

US 2003/0170166 A1  Sep. 11, 2003

Related U.S. Application Data

(60) Provisional application No. 60/337,951, filed on Dec. 7, 2001, provisional application No. 60/337,561, filed on Nov. 8, 2001, provisional application No. 60/303,469, filed on Jul. 6, 2001, provisional application No. 60/303,470, filed on Jul. 6, 2001.

(51) Int. Cl.
*D01F 9/12* (2006.01)

(52) U.S. Cl. ............................. 252/378 R; 423/447.1; 423/460; 977/842; 264/105

(58) Field of Classification Search ............. 423/447.1, 423/460; 252/378 R; 264/105, 108; 977/842
See application file for complete search history.

(56) References Cited

U.S. PATENT DOCUMENTS

| | | | |
|---|---|---|---|
| 4,663,230 A | 5/1987 | Tennent | 428/367 |
| 5,165,909 A | 11/1992 | Tennent et al. | 423/447.3 |
| 5,171,560 A | 12/1992 | Tennent | 423/447.3 |
| 5,424,054 A | 6/1995 | Bethune et al. | 423/447.2 |
| 5,457,343 A | 10/1995 | Ajayan et al. | 257/734 |
| 5,500,200 A | 3/1996 | Mandeville et al. | 423/447.3 |
| 5,578,543 A | 11/1996 | Tennent et al. | 502/180 |
| 5,589,152 A | 12/1996 | Tennent et al. | 423/447.3 |
| 5,591,312 A | 1/1997 | Smalley | |
| 5,698,175 A | 12/1997 | Hiura et al. | 423/447.1 |
| 5,707,916 A | 1/1998 | Snyder et al. | 502/180 |
| 5,877,110 A | 3/1999 | Snyder et al. | 502/180 |
| 6,183,714 B1 | 2/2001 | Smalley et al. | 423/447.3 |
| 6,187,823 B1 | 2/2001 | Haddon et al. | |
| 6,203,814 B1 | 3/2001 | Fisher et al. | 424/443 |
| 6,221,330 B1 | 4/2001 | Moy et al. | 423/447.3 |
| 6,232,706 B1 | 5/2001 | Dai et al. | 313/309 |
| 6,235,674 B1 | 5/2001 | Tennent et al. | 502/174 |
| 6,312,303 B1 | 11/2001 | Yaniv et al. | 445/24 |

FOREIGN PATENT DOCUMENTS

| | | |
|---|---|---|
| EP | 0 989 579 A2 | 3/2000 |
| JP | 09188509 | 7/1997 |
| WO | WO 98/05920 | 2/1998 |
| WO | WO 98/39250 | 9/1998 |
| WO | WO 00/17102 | 3/2000 |
| WO | WO 00/26138 | 5/2000 |
| WO | WO 01/12700 | 2/2001 |
| WO | WO 01/30694 | 5/2001 |
| WO | WO 01/92381 | 12/2001 |
| WO | WO 02/16257 A2 | 2/2002 |

OTHER PUBLICATIONS

Kiang et al., "Carbon Nanotubes with Single-Layer Walls," *Carbon*, vol. 33, No. 7, pp. 903-914 (1995).
Ajayan et al., "Aligned Carbon Nanotube Arrays Formed by Cutting a Polymer Resin-Nanotube Composite," *Science*, vol. 265, pp. 1212-1214 (Aug. 26, 1994).
Ajayan et al., "Growth morphologies during cobalt-catalyzed single-shell carbon nanotube synthesis," *Chemical Physics Letters*, vol. 215, No. 5, pp. 509-517 (Dec. 10, 1993).
Ajiki et al., "Magnetic Properties of Carbon Nanotubes," *Journal of the Physical Society of Japan*, vol. 62, No. 7, pp. 2470-2480 (Jul. 1993).
Andrews et al., "Nanotube composite carbon fibers," *Applied Physics Letters*, vol. 75, No. 9, pp. 1329-1331 (Aug. 30, 1999).
Avigal et al., "Growth of aligned carbon nanotubes by biasing during growth," *Applied Physics Letters*, vol. 78, No. 16, pp. 2291-2293 (Apr. 16, 2001).
Bethune et al., "Cobalt-catalysed growth of carbon nanotubes with single-atomic-walls," *Nature*, vol. 363, pp. 605-607 (Jun. 17, 1993).
Boul et al., "Reversible sidewall functionalization of buckytubes," *Chemical Physics Letters*, vol. 310, pp. 367-372 (Sep. 3, 1999).

(Continued)

*Primary Examiner*—Stuart Hendrickson
(74) *Attorney, Agent, or Firm*—Ross Spencer Garsson; Edward Mickelson; Winstead Sechrest & Minick P.C.

(57) ABSTRACT

The present invention involves fibers of highly aligned single-wall carbon nanotubes and a process for making the same. The present invention provides a method for effectively dispersing single-wall carbon nanotubes. The process for dispersing the single-wall carbon nanotubes comprises mixing single-wall carbon nanotubes with 100% sulfuric acid or a superacid, heating and stirring under an inert, oxygen-free environment. The single-wall carbon nanotube/acid mixture is wet spun into a coagulant to form the single-wall carbon nanotube fibers. The fibers are recovered, washed and dried. The single-wall carbon nanotubes were highly aligned in the fibers, as determined by Raman spectroscopy analysis.

34 Claims, 8 Drawing Sheets

OTHER PUBLICATIONS

Bubke et al., "Optical anisotropy of dispersed carbon nanotubes induced by an electric field," *Applied Physics Letters*, vol. 71, No. 14, pp. 1906-1908 (Oct. 6, 1997).

Chen et al., "Aligning single-wall carbon nanotubes with an alternating-current electric field," *Applied Physics Letters*, vol. 78, No. 23 (Jun. 4, 2001).

Chiang et al., "Purification and Characterization of Single-Wall Carbon Nanotubes," *J. Phys. Chem. B*, vol. 105, pp. 1157-1161 (Jan. 12, 2001).

Dai et al., "Single-wall nanotubes produced by metal-catalyzed disproportionation of carbon monoxide," *Chemical Physics Letters*, vol. 260, pp. 471-475 (Sep. 27, 1996).

Dresselhaus, et al., "$C_{60}$-Related Tubules and Spherules," *Science of Fullerenes and Carbon Nanotubes*, Chapter 19, Academic Press, San Diego, pp. 756-869 (1996).

Ebbesen, "Carbon Nanotubes," *Annual Review of Materials Science*, vol. 24, pp. 235-264 (1994).

Ebbesen et al., "Large-scale synthesis of carbon nanotubes," *Nature*, vol. 358, pp. 220-222, (Jul. 16, 1992).

Guo et al., "Catalytic growth of single-walled nanotubes by laser vaporization," *Chemical Physics Letters*, vol. 243, pp. 49-54 (Sep. 8, 1995).

Guo et al., "Self-Assembly of Tubular Fullerenes," *J. Phys. Chem.*, vol. 99, No. 27, pp. 10694-10697 (1995).

Hiura et al., "Opening and Purification of Carbon Nanotubes in High Yields," *Advanced Materials*, vol. 7, No. 3, pp. 275-276 (1995).

Hone et al., "Electrical and thermal transport properties of magnetically aligned single wall carbon nanotube films," *Applied Physics Letters*, vol. 77, No. 5, (Jul. 31, 2000).

Iijima, "Helical microtubules of graphitic carbon," *Nature*, vol. 354, pp. 56-58 (1991).

Iijima et al., "Single-shell carbon nanotubes of 1-nm diameter," *Nature*, vol. 363, pp. 603-605 (Jun. 17, 1993).

Journet et al., "Large-scale production of single-walled carbon nanotubes by the electric-arc technique," *Nature*, vol. 388, pp. 756-758 (Aug. 21, 1997).

Lambert et al., "Improving conditions towards isolating single-shell carbon nanotubes," *Chemical Physics Letters*, vol. 226, pp. 364-371 (Aug. 19, 1994).

Liu et al., "An electron enegry-loss study of the structural and electronic properties of magnetically aligned single wall carbon nanotubes," *Synthetic Metals*, vol. 121, pp. 1183-1186 (2001).

Liu et al., "Fullerene Pipes," *Science*, vol. 280, pp. 1253-1256 (May 22, 1998).

Lu, "Novel Magnetic Properties of Carbon Nanotubes," *Physics Review Letters*, vol. 74, No. 7, pp. 1123-1125 (Feb. 13, 1995).

Mickelson et al., "Fluorination of single-wall carbon nanotubes," *Chemical Physics Letters*, vol. 296, pp. 188-194 (Oct. 30, 1998).

Nikolaev et al., "Gas-phase catalytic growth of single-walled carbon nanotubes from carbon monoxide," *Chemical Physics Letters*, vol. 313, pp. 91-97 (Nov. 5, 1999).

Rinzler et al., "Large-scale purification of single-wall carbon nanotubes: process, product, and characterization," *Applied Physics A*, vol. 67, pp. 29-37 (1998).

Rinzler et al., "Unraveling Nanotubes: Field Emission from an Atomic Wire," *Science*, vol. 269 (Sep. 15, 1995).

Saito et al, "Carbon Nanocapsules Encaging Metals and Carbides," *J. Phys. Chem. Solids*, vol. 54, No. 12, pp. 1849-1860 (1993).

Saito et al., "Extrusion of single-wall carbon nanotubes via formation of small particles condensed near an arc evaporation source," *Chemical Physics Letters*, vol. 236, pp. 419-426 (Apr. 21, 1995).

Sepaphin et al., "Single-Walled Tubes and Encapsulation of Nanocrystals into Carbon Clusters," *J. Electrochem. Soc.*, vol. 142, No. 1, pp. 290-297 (Jan. 1995).

Smith et al., "Structural anisotropy of magnetically aligned single wall carbon nanotube films," *Applied Physics Letters*, vol. 77, No. 5, pp. 91-97 (Jul. 31, 2000).

Srivastava et al., "Effect of external electric field on the growth on nanotubes," *Applied Physics Letters*, vol. 72, No. 14, pp. 1685-1687 (Apr. 6, 1998).

Thess et al., "Crystalline Ropes of Metallic Carbon Nanotubes," *Science*, vol. 273 (Jul. 26, 1996).

Venema et al., "Length control of individual carbon nanotubes by nanostructuring with a scanning tunneling microscope," *Applied Physics Letters*, vol. 71, No. 18, pp. 2629-2631 (Nov. 3, 1997).

Walters et al., "In-plane-aligned membranes of carbon nanotubes," *Chemical Physics Letters*, vol. 338, pp. 14-20 (Apr. 13, 2001).

Yakobson et al., "Fullerene Nanotubes: $C_{1,000,000}$ and Beyond," *American Scientist*, vol. 85, pp. 324-337 (Jul.-Aug. 1997).

Yamamoto et al., "Orientation of Carbon Nanotubes Using Electrophoresis," *Japanese Journal of Applied Physics*, Part 2 Letters, vol. 35, No. 78, pp. L917-L918 (1996).

Yanagi et al., "Self-orientation of short single-walled carbon nanotubes deposited od graphite," *Applied Physics Letters*, vol. 78, No. 10, pp. 1355-1357 (Mar. 5, 2001).

Zhou et al., "Single-walled carbon nanotubes growing radically from $YC_2$ particles," *Applied Physics Letters*, vol. 65, No. 12, pp. 1593-1595 (Sep. 19, 1994).

FIBERS OF ALIGNED SINGLE-WALL CARBON NANOTUBES AND PROCESS FOR MAKING THE SAME

CROSS-REFERENCES TO RELATED APPLICATIONS

This application claims priority from United States provisional applications, Ser. No. 60/303,469, entitled "Single Wall Carbon Nanotube Alewives" and 60/303,470, entitled "Intercalated Single Wall Carbon Nanotube (I-SWNT) Solids As Easily Dispersible Materials," both filed Jul. 6, 2001, 60/337,561, entitled "Carbon Alewives: Intrinsically Aligned Aggregates of Single Wall Carbon Nanotubes" filed Nov. 8, 2001, and 60/337,951, entitled "SWNT Fibers Spun From Super Acids," filed Dec. 7, 2001, which applications are each incorporated herein by reference.

This patent application is related to U.S. patent application Ser. No. 10/187,729, "Single-Wall Carbon Nanotube Alewives, Process for Making, and Compositions Thereof," to Smalley, et al., filed concurrent herewith and incorporated herein by reference.

This invention relates to fibers comprising aligned single-wall carbon nanotubes and process for making the same.

This invention was made with United States Government support under Grant No. JSC NCC 9-77 awarded by the National Aeronautical and Space Administration, Grant No. DMR-9802892 awarded by the National Science Foundation, and DURINT Grant Nos. N00014-01-1-0789 and N00014-01-1-0791 awarded by the Office of Naval Research. Funding was also provided by the Texas Advanced Technology Program Grant No. 99-003604-0055-199, and the Robert A. Welch Foundation Grant No. C-0689. Government may have certain rights in the invention.

BACKGROUND OF THE INVENTION

Single-wall carbon nanotubes (SWNT) are fullerenes of closed-cage carbon molecules typically arranged in hexagons and pentagons. Commonly known as "buckytubes," these cylindrical carbon structures have extraordinary properties, including high electrical and thermal conductivity, as well as high strength and stiffness. (See B. I. Yakobson and R. E. Smalley, *American Scientist*, Vol. 85, July–August, 1997, pp. 324–337.)

With an intrinsic strength estimated to be on the order of 100 times that of steel, single-wall carbon nanotubes are a possible strengthening reinforcement in composite materials. The intrinsic electronic properties of single-wall carbon nanotubes also make them electrical conductors and useful in applications involving field emission devices, such as flat-panel displays, and in polymers used for radiofrequency interference and electromagnetic shielding that require electrical conductance properties. In other applications involving electrical conduction, single-wall carbon nanotubes and ropes of single-wall carbon nanotubes are useful in electrically conductive coatings, polymers, paints, solders, fibers, electrical circuitry, and electronic devices, including batteries, capacitors, transistors, memory elements, current control elements, switches and electrical connectors in microdevices such as integrated circuits and semiconductor chips used in computers. The nanotubes are also useful as antennas at optical frequencies as constituents of non-linear optical devices and as probes for scanning probe microscopy such as are used in scanning tunneling microscopes (STM) and atomic force microscopes (AFM). Their exceptional thermal conductivity properties render single-wall carbon nanotubes useful in composites, coatings, pastes, paints and other materials where heat transfer is a desired property. In composite materials, aligned single-wall carbon nanotubes can provide enhanced electrical, mechanical, optical, and/or thermal properties. Single-wall carbon nanotubes can be used as replacement for, or in conjunction with, carbon black in tires for motor vehicles, and as elements of composite materials to elicit specific physical, chemical or mechanical properties in those materials, such as electrical and/or thermal conductivity, chemical inertness, mechanical toughness, etc. The nanotubes themselves and materials and structures comprising carbon nanotubes are also useful as supports for catalysts in chemical processes, such as hydrogenation, polymerization and cracking, and in devices such as fuel cells.

To capture the exceptional properties of single-wall carbon nanotubes, numerous attempts have been made to incorporate the nanotubes into other materials, such as polymers, ceramics, metals and materials of manufacture. However, one of the problems encountered in making composite blends is the difficulty in dispersing single-wall carbon nanotubes. With a better dispersion of the nanotubes, more of the nanotube properties could be imparted to the composite medium at a lower nanotube loading.

The largest complication in dispersing single-wall carbon nanotubes is their propensity to tightly self-associate with each other. When single-wall carbon nanotubes come in close contact with each other, they tend to become tightly bound by van der Waals forces, which act to hold the nanotubes tightly together as "ropes" of aligned bundles of a few to many hundreds of nanotubes. Besides this ordered roping alignment, there is also significant disordered entanglement when many of the single-wall carbon nanotubes and ropes of single-wall carbon nanotubes contact each other randomly during synthesis, external compression and/or subsequent purification. These randomly oriented, entangled mats of individual single-wall carbon nanotubes and ropes of single-wall carbon nanotubes are very difficult to disperse into other materials, such as polymers, either as individual single-wall carbon nanotubes or ropes of single-wall carbon nanotubes. The compression and matting is especially problematic after purification processes involving liquid-phase treatments, such as described in Chiang, et. al., "Purification and Characterization of Single-Wall Carbon Nanotubes," *J. Phys. Chem. B*, 105, 1157–1161, (2001). In this procedure and other wet methods, the single-wall carbon nanotubes are wetted with water or some other solvent, either in the chemical purification or as part of the filtering and washing. Subsequent drying by evaporation causes the single-wall carbon nanotubes to more closely associate and remain tightly associated through van der Waals interactions. With evaporation drying, the bulk density of the single-wall carbon nanotubes increases more than an order of magnitude over the initial raw material whose bulk density is of the order of 0.01 g/cc. Densification occurs because capillary forces promote a collapse of the space between the ropes of single-wall carbon nanotubes that exist in the original sample. A denser single-wall carbon nanotube product complicates the formation of a substantially uniform dispersion of single-wall carbon nanotubes in applications where dispersal of the individual single-wall carbon nanotube segments and ropes is desirable or required. Redispersing the individual single-wall carbon nanotubes or single-wall carbon nanotube ropes after they are in the denser matted form is difficult and problematic. Further processing to achieve redispersion may not only affect the nanotube properties, but also increases the cost of composites and final products due to higher labor and equipment requirements.

A related complication in dispersing single-wall carbon nanotubes is that due to their chemical composition and structure, the nanotubes are generally quite insoluble in liquids and other media. The nanotubes would generally tend to self-associate with each other through van der Waals interactions rather than disperse in other media.

The ability to disperse single-wall carbon nanotubes remains one of the largest barriers in realizing the full potential of single-wall carbon nanotubes in various applications. Besides the challenge of dispersing single-wall carbon nanotubes, even when dispersed, the single-wall carbon nanotubes and ropes of single wall carbon nanotubes may not provide the optimum configuration to achieve the full potential of the strength and properties of the nanotubes unless they are aligned. Controlled alignment of single-wall carbon nanotubes from surfactant-assisted suspensions and fabrication of macroscopic forms of single-wall carbon nanotubes such as fibers or shear-aligned aggregates face the inherent limitations of the single-wall carbon nanotube-surfactant system. Since the van der Waals forces between the single-wall carbon nanotubes and ropes of single-wall carbon nanotubes are larger than the weak electrostatic repulsions arising from the adsorbed surfactant molecules, the single-wall carbon nanotube solutions are generally very low in concentration and impractical for many applications. Although oriented single-wall carbon nanotube fibers could be prepared with surfactant dispersions by shear flow-induced alignment in a co-flowing stream of polymer solution, the single-wall carbon nanotube concentrations attainable in a sodium dodecyl benzene sulfonate/single-wall carbon nanotube/water system are generally too low (i.e., less than about 1 wt %) to achieve coordinated single-wall carbon nanotube alignment.

Some methods to disperse single-wall carbon nanotubes have focused on overcoming the van der Waals forces which hold the nanotubes in intimate contact. One chemical approach to separating the nanotubes and making them more soluble includes functionalization with solubilizing moieties, either on the ends and/or the sides of the nanotubes. See "Carbon Fibers Formed from Single-Wall Carbon Nanotubes," International Pat. Publ. WO 98/39250 published Sep. 11, 1998, and "Chemical Derivatization of Single-Wall Carbon Nanotubes to Facilitate Solvation Thereof, and Use of Derivatized Nanotubes," International Pat. Publ. WO 00/17101, published Mar. 30, 2000, both of which are incorporated by reference herein in their entirety. Another way of dispersing single-wall carbon nanotubes is by introducing an intercalating species that will separate the nanotubes using a physio-chemical approach. Oleum, a well-known superacid, has been used as an intercalating species so as to suspend and disperse single-wall carbon nanotubes and make large "super ropes" of aligned nanotubes. See "Macroscopic Ordered Assembly of Carbon Nanotubes," International Pat. Publ. WO 01/30694 A1, published May 3, 2001, incorporated by reference herein in its entirety. Physical methods for inducing separation of the nanotubes have included sonication and other means of intensive mixing. However, these aggressive techniques can induce damage, shear and breakage in the nanotubes, and, thereby, compromise the desired nanotube properties for the intended application.

Wrapping single-wall carbon nanotubes with amphiphilic polymers has also been shown as a means to overcome van der Waals forces between single-wall carbon nanotubes. See "Polymer-Wrapped Single Wall Carbon Nanotubes," International Pat. Publ. WO 02/16257 published Feb. 28, 2002, incorporated by reference herein in its entirety. Although polymer wrapping of the nanotube enables the dispersion of single-wall carbon nanotubes in water and other solvents, higher concentrations of nanotubes dispersed in other media over a broad range of temperature conditions are often desired.

Thus, there is a need for a form of single-wall carbon nanotubes in which the nanotubes are aligned and can be dispersed in other media, such as polymers, ceramics, metals and other media used in manufacture. There is also a need to be able to redisperse the aligned aggregate into individual nanotubes or smaller aggregates of single-wall carbon nanotubes. Likewise, there is a need for composites comprising dispersed, highly aligned single-wall carbon nanotubes.

SUMMARY OF THE INVENTION

The present invention is a composition of matter which provides a new discrete aggregate comprising highly-aligned single-wall carbon nanotubes. The aggregates are called "carbon alewives" for their resemblance to the Atlantic fish bearing that name. The single-wall carbon nanotube alewife aggregate is a distinct aggregate. The shape is acicular, or "needle-like," with a thicker middle that tapers toward the ends. Alewives are substantially free of tangles of long ropes and can be easily dispersed and incorporated into other materials, such as polymers, metals, ceramics, metal oxides and liquids. The invention also includes composites comprising carbon alewives, wherein the single-wall carbon nanotubes are substantially aligned and impart properties of the single-wall carbon nanotubes, such as reinforcement, enhanced tensile strength and/or electrical and thermal conductivity, to the composite.

The invention provides a method for preparing carbon alewives. The method comprises introducing single-wall carbon nanotubes into 100% sulfuric acid or a superacid and mixing at room or an elevated temperature under an inert, anhydrous and oxygen-free environment. The carbon alewives are formed by introducing moisture into the mixture of single-wall carbon nanotubes and anhydrous 100% sulfuric acid or superacid at room or an elevated temperature. The alewives are recovered, washed and dried to form dry carbon alewives. For a given set of preparation conditions, the size of the alewives is dependent on the initial single-wall carbon nanotube concentration in the acid and is monodisperse for each concentration, with smaller alewives formed at lower concentrations. The invention provides an aggregate form of aligned single-wall carbon nanotubes that enables the incorporation of highly-aligned single-wall carbon nanotubes into other materials, such as polymers, metals, ceramics and liquids, over a broad range of concentrations with good dispersion of the nanotubes so as to enhance the properties of the resulting composite material. Because the single-wall carbon nanotube alewives are discrete aggregates, they are easy to handle and process. The invention also enables the formation of single-wall carbon nanotube/polymer masterbatches, where the nanotube concentration in the polymer is generally higher than desired for the end-use, so that the masterbatch can be mixed with more polymer in processing to achieve the desired concentration for the particular end-use.

The invention also provides a method for producing "super ropes" and fibers of aligned single-wall carbon nanotubes using anhydrous 100% sulfuric acid or other superacids.

DETAILED DESCRIPTION OF THE INVENTION

Figure 1:
FIG. 1 shows a scanning electron micrograph of single-wall carbon nanotube alewives at 500× magnification obtained from a 4 wt % single-wall carbon nanotube/oleum/water system.

The present invention is a composition of matter which provides a new aggregate form comprising of highly-aligned single-wall carbon nanotubes. The aggregates, called "carbon alewives," have a distinct and discrete acicular (needle-like) shape, are substantially free of tangles of long ropes and can be easily dispersed and incorporated into other materials, such as polymers, metals, ceramics and liquids, over a broad range of concentrations. The invention provides a means of preparing carbon alewives in which the single-wall carbon nanotubes are substantially aligned and retain their tensile and conductive properties. This invention also provides a means of preparing fibers of aligned single-wall carbon nanotubes.

Carbon alewives are discrete aggregates, the size of which is dependent on the particular preparation conditions. Alewives have a center thickness that is generally in the range between about 0.5 microns and about 10 microns wide, more typically between about 2 and about 5 microns wide. The length of the carbon alewives is generally up to about 50 microns, typically in the range between about 10 and about 50 microns in length, more typically in the range between about 10 and about 30 microns. The size of the single-wall carbon nanotube alewives can be dependent on the initial single-wall carbon nanotube concentration in 100% sulfuric acid or superacid in which they are made. For a given set of preparation conditions, smaller alewives are observed at lower concentrations. The size of the alewives is generally monodisperse at any concentration.

Although carbon alewives are discrete aggregates, another embodiment of this invention includes the form of carbon alewives where the alewives are connected end-to-end. The carbon alewives are generally straight, however another embodiment of this invention includes curved or crescent-shaped alewives.

Carbon alewives can be made using single-wall carbon nanotubes prepared by any known method. Single-wall carbon nanotubes prepared by the gas-phase reaction of high pressure carbon monoxide and a transition metal catalyst, such as described in "Gas Phase Nucleation and Growth of Single-Wall Carbon Nanotubes from High Pressure Carbon Monoxide," International Pat. Publ. WO 00/26138, published May 11, 2000, incorporated by reference herein in its entirety, are preferred. The single-wall carbon nanotubes can be used as-synthesized or after purification. Purification can be performed by any method known by those of ordinary skill in the art. For methods of purification, see "Process for Purifying Single-Wall Carbon Nanotubes and Compositions Thereof," International PCT Patent Application, Ser. No. PCT/US02/03957, filed Feb. 11, 2002, and "Gas-Phase Process for Purifying Single-Wall Carbon Nanotubes and Compositions Thereof," International PCT Patent Application, Ser. No. PCT/US02/03952, filed Feb. 11, 2002, both of which are incorporated by reference in their entirety herein. Without meaning to be limited, one method of purification which can be used includes a gas phase oxidation, aqueous hydrochloric acid treatment and water washing. The oxidation, which may be done with or without moisture present, serves to oxidize and remove amorphous carbon. The oxidation can also oxidize the residual catalyst metal after breaching any carbon encapsulation. The oxidation is typically done for about 1 to about 3 hours at a temperature range of about 175° C. to about 300° C., in ambient air or with oxygen, optionally water vapor, and nitrogen or an inert gas. After oxidation, the single-wall carbon nanotubes are treated with aqueous hydrochloric acid which reacts with the metal catalyst to form metal halides which are soluble in the acid solution. Finally, the single-wall carbon nanotubes are filtered, washed with water and solvent, and dried. The dried product is a highly tangled mat of single-wall carbon nanotubes.

The as-prepared or purified single-wall carbon nanotubes can be, optionally, ground to a sub-millimeter size with a mortar and pestle or other grinding means such as a ball mill. Whether or not the nanotubes are ground, the nanotubes are mixed with 100% sulfuric acid or a superacid. It has been found that the use of oleum and certain other superacids can lead to non-redispersibility of the individual nanotubes in the aggregate. For example, it has been observed that with the use of oleum, higher $SO_3$ content in the oleum is more likely to cause the individual nanotubes in the aggregate to be non-redispersible, "an aggregate non-redispersing acid." An acid in which the individual single-wall carbon nanotubes in the aggregate are substantially redispersible in the acid ("an aggregate substantially redispersing acid") is preferred, if substantial redispersibility of the individual single-wall carbon nanotubes in the aggregate is desired. An acid in which the individual single-wall carbon nanotubes in the aggregate are redispersible in the acid ("an aggregate redispersing acid") is preferred, if redispersibility of the individual single-wall carbon nanotubes in the aggregate is desired. It should be noted that there is a distinction between aggregates (i.e., alewives) being dispersible in a medium and the single-wall carbon nanotubes of the aggregate being dispersible in a superacid. In the former, the alewives disperse in the medium and retain their integrity as alewives. In the later, the aggregate can lose its integrity in the aggregate substantially redispersing acid/aggregate redispersing acid such that the single-wall carbon nanotubes in the aggregate disperse in that acid.

Superacids useful for making carbon nanotube alewives can be of various types, such as Brønsted superacids, Lewis superacids, and conjugate Brønsted-Lewis superacids. The superacids can be in a melt, liquid or gaseous form. Brønsted superacids are those whose acidity exceeds that of 100% sulfuric acid. Examples of Brønsted superacids include perchloric acid ($HClO_4$), chlorosulfuric acid ($ClSO_3H$), fluorosulfuric acid ($HSO_3F$), chlorosulfonic acid, fluorosulfonic acid, and perfluoroalkanesulfonic acids, such as trifluoromethanesulfonic acid ($CF_3SO_3H$), also known as triflic acid, and higher perfluoroalkanesulfonic acids, such as $C_2F_5SO_3H$, $C_4F_9SO_3H$, $C_5F_{11}SO_3H$, $C_6F_{13}SO_3H$, $C_8F_{17}SO_3H$,

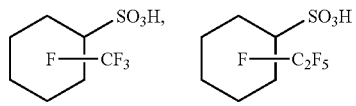

and α, ω-perfluoroalkanedisulfonic acids. Lewis superacids have been defined by Olah, et al. (See "Superacids" John Wiley & Sons, 1985) as those acids stronger than anhydrous aluminum chloride. Lewis superacids include antimony pentafluoride, arsenic pentafluoride, tantalum pentafluoride and niobium pentafluoride. Antimony pentafluoride and arsenic pentafluoride form stable intercalation compounds with graphite. Conjugate Brønsted-Lewis superacids include $SO_3$-containing sulfuric acids, also known as oleums or polysulfuric acids, polyphosphoric acid-oleum mixtures, tetra(hydrogen sulfato)boric acid-sulfuric acid, fluorosulfuric acid-antimony pentafluoride (also known as "magic acid"), fluorosulfuric acid-sulfur trioxide, fluorosulfuric acid-arsenic pentafluoride, $HSO_3F:HF:SbF_5$, $HSO_3F:SbF_5:SO_3$, perfluoroalkanesulfonic acid-based systems, such as $C_nF_{2n+1}$ $SO_3H:SbF_5$, where n=1, 2 or 4, and $CF_3SO_3H:B(SO_3CF_3)_3$, hydrogen-fluoride-antimony pentafluoride (also known as fluoroantimonic acid), hydrogen fluoride-tantalum pentafluoride, hydrogen fluoride-boron trifluoride (also known as tetrafluoroboric acid), and conjugate Friedel-Crafts acids, such as $HBr:AlBr_3$, and $HCl:AlCl_3$. For description and clarity, oleum will be used herein as the exemplary superacid; however, it would be recognized by those of ordinary skill in the art to utilize anhydrous 100% sulfuric acid or any other superacid, such as those listed above.

Single-wall carbon nanotubes, as-synthesized, purified and/or ground, are mixed with oleum and stirred from at least about 3 hours to up to about 3 days at a temperature ranging from about room temperature to about 150° C., preferably from about 90° C. to 130° C. The single-wall carbon nanotubes are introduced into the oleum so as to produce a single-wall carbon nanotube/oleum mixture at a concentration of about 0.01 wt % to about 10 wt % single-wall carbon nanotubes in the moisture-free oleum. Although not meaning to be bound by theory, it is believed that during the mixing process, the oleum intercalates between individual single-wall carbon nanotubes and forms single-wall carbon nanotube ropes having widths ranging from about 30 nm to about 40 nm. The intercalation of the oleum is expected to reduce the effects of the van der Waals forces and permit the single-wall carbon nanotubes to slide against each other and self-align. The intercalation allows the further thickening of the ropes by adding more aligned single-wall carbon nanotubes to form larger aggregates which are on the order of about 200 nm to about 400 nm in diameter. The ropes thicken further to a thickness from about 1 to about 2 microns (about 1000 to about 2000 nm).

The distinct, discrete and unique alewife aggregates are then formed by slowly adding water to the heated anhydrous single-wall carbon nanotube/oleum mixture. One method of slowly incorporating water is by allowing the anhydrous single-wall carbon nanotube/oleum mixture to absorb moisture ambient air overnight while heating at a temperature between about 90° C. and 100° C., with optional stirring. The slow incorporation of moisture into the single-wall carbon nanotube/oleum system results in a single-wall carbon nanotube/oleum/water mixture and the formation of carbon alewives. The alewives are isolated from the nanotube/oleum water mixture by dumping the mixture in a suitable solvent, such as dry ether, and filtering the alewives. The alewives can be washed with a suitable solvent or solvents, such as methanol, and dried.

Humidified air or another gas, such as nitrogen or an inert gas, containing water vapor may also be used to introduce water to the single-wall carbon nanotube/oleum mixture by passing it over the nanotube/acid mixture. A dry gas may be humidified by passing the gas through a water bubbler. The amount of water carried by the gas can be controlled by the flow rate of the gas and the temperature of the water in the bubbler. The rate of moisture addition to the single-wall carbon nanotube/acid mixture can be adjusted through control of the amount of moisture in the gas in the bubbler and by mixing the moisture-containing gas with a stream of dry gas. By adjusting different parameters, including the temperature of the nanotube/acid mixture and the amount of stirring, the rate of moisture addition to the nanotube/acid mixture can be controlled at a low rate so that alewives form from the mixture. Generally, it is desirable to introduce moisture at a slower rate for lower initial single-wall carbon nanotube concentrations in the nanotube/acid mixture.

A typical scenario for the addition of moisture to a nanotube/acid mixture is included in the following procedure using 100% sulfuric acid. A mixture of 4 wt % single-wall carbon nanotubes in 100% sulfuric acid was heated to 110° C. and stirred under flowing argon at 50 cc/min for 24 hours. The stirred mixture was exposed to argon that was flowing at 50 cc/min through a bubbler containing water at room temperature. The temperature of the mixture was lowered to. 70° C. and the moisture exposure was continued for 6 hours. After moisture exposure, the mixture was dumped into dry diethyl ether. The carbon alewives were washed in diethyl ether and dried overnight at room temperature under vacuum. There are many different configurations that could be used by those of ordinary skill in the art to control the introduction of moisture into a nanotube/acid system such that alewives form.

Carbon alewives are formed under certain controlled conditions. If water is not added to the anhydrous the single-wall carbon nanotube/oleum mixture, or if water is not added sufficiently slowly, or if the mixture is not heated at a sufficient temperature, the resulting single-wall carbon nanotube structure is in a form called "super ropes," which are approximately one-half micron to about two microns wide. Like single-wall carbon nanotubes and single-wall carbon nanotube ropes, the super ropes are long, tangled and enmeshed. Recovered and dried super ropes would be very difficult to process and disperse in other materials.

Without forming alewives, it is possible to produce fibers of aligned single-wall carbon nanotube from a nanotube/acid mixture. Generally, it is desirable to extrude fibers with higher concentrations of single-wall carbon nanotubes in 100% sulfuric acid or a superacid. Superacids, such as those listed above for the preparation of alewives can be used. Preferred acids are 100% sulfuric acid, trifluromethanesulfonic acid (also known as triflic acid) and oleum. More preferred are 100% sulfuric acid and trifluromethanesulfonic acid. The fibers are made by mixing single-wall carbon nanotubes, as-synthesized, purified and/or ground, with 100% sulfuric acid or a superacid and stirring from at least about 3 hours to up to about 3 days at a temperature ranging from about room temperature to about 150° C., preferably from about 90° C. to 130° C. The nanotube/acid mixture is kept anhydrous and oxygen-free by doing the mixing under nitrogen or an inert gas atmosphere. The single-wall carbon nanotube concentration in the acid can be in a range of about 0.01 wt % to about 10 wt % or higher. During the mixing process, it is believed that the components of the acid intercalate between individual single-wall carbon nanotubes and permits the single-wall carbon nanotubes to slide against each other and self-align. The nanotube/acid mixture is extruded through a die, which also promotes alignment of the nanotubes, directly into a coagulant without contacting a gaseous environment. This type of fiber spinning is generally known as wet spinning. Coagulant baths can include water, diethyl ether, ethylene glycol, 10% sulfuric acid, and mixtures thereof. After the fiber is coagulated, it can be washed to remove intercalating species and dried. Suitable washing media can include water, diethyl ether, methanol and mixtures thereof. Drying means can include air drying or drying in a heated oven. Drying can also include vacuum drying. Optionally, the fiber can be post-treated. Not meaning to be limited, post-treatments can include annealing in an inert gas at an elevated temperature and reducing in a hydrogen atmosphere. Annealing temperatures can be in the temperature range of about 400° C. and 800° C. Temperatures for subjecting the fibers to a reducing environment can be up to about 450° C. Tension may be applied to the fiber as part of any post-treatment.

Figure 2:
FIG. 2 shows a scanning electron micrograph of single-wall carbon nanotube alewives at 2500× magnification.
Figure 3:
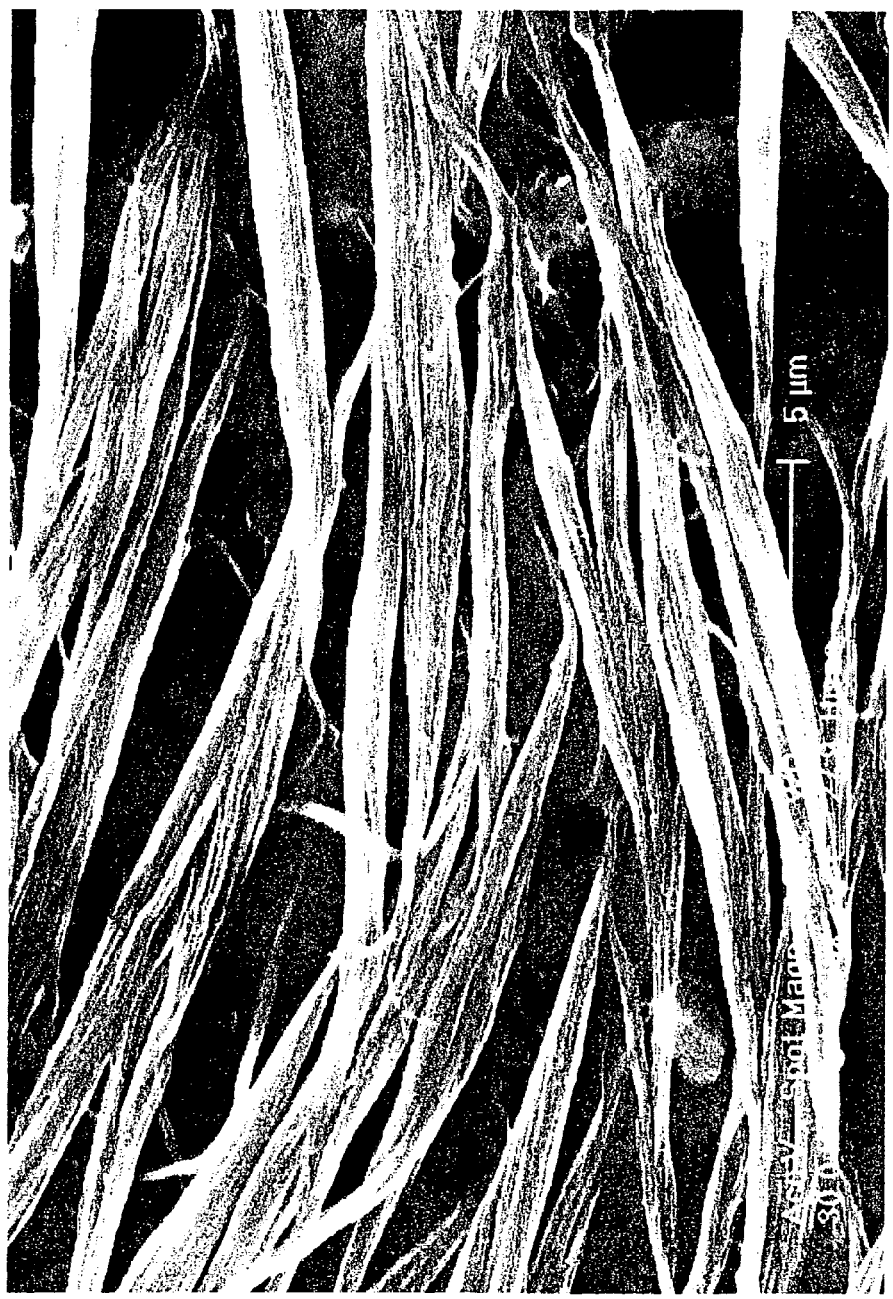
FIG. 3 shows a scanning electron micrograph of single-wall carbon nanotube alewives at 5000× magnification.

Carbon alewives, however, are discrete aggregates of highly aligned single-wall carbon nanotubes. They are generally monodisperse in size and shape for a particular concentration. Recovered and dried alewives of the present invention are shown in scanning electron micrographs at magnifications of 500×, 2500× and 5000×, in FIGS. 1, 2 and 3, respectively.

For any given preparation conditions, the length and width of the carbon alewives appears to be dependent on the initial concentration of the single-wall carbon nanotubes in acid. For example, the alewives collected from a 4 wt % single-wall carbon nanotube/oleum/water system were about 1 to about 2 microns thick at the center and about 10 to about 15 microns long. At lower concentrations of single-wall carbon nanotubes, the alewives were thinner and shorter. For example, the alewives collected from a 0.25 wt % and 1 wt % single-wall carbon nanotube/oleum/water systems were up to about a half micron thick at the center and about 12 microns long.

Figure 4:
FIG. 4 shows an optical micrograph of single-wall carbon nanotube alewives with a single alewife in the cross-hairs.

In contrast to the randomness observed in as-synthesized and/or purified single-wall carbon nanotubes and single-wall carbon nanotube ropes, the single-wall carbon nanotubes in the alewives are highly aligned. The internal alignment of the single-wall carbon nanotubes in the alewives was quantified by Raman spectroscopy using the Fraser fraction, f where $f=(R-1)/(R+4)$, and R, the alignment ratio, is the Raman intensity ratio between the parallel and perpendicular orientations of the nanotube aggregates. The value for f can range from 0 for an isotropic, random non-alignment to 1 for perfect alignment. Spectra were collected with a Renishaw polarized Raman microanalyzer operated in the reflectance mode using a linearly polarized laser beam from a 780-nm diode laser (2.3 mW, 1 μm beam diameter) as the excitation source. The ratio of the parallel and perpendicular intensities of the $E_{2g}$ mode at 1593 cm$^{-1}$ was taken to quantify the single-wall carbon nanotube alignment. Raman spectra were recorded at two different aggregate orientations, i.e., in the plane of polarization, parallel and perpendicular to the longer axis of each alewife. To perform the analysis, the orientation of each aggregate is aligned with an optical microscope on a rotating X-Y stage such that the long axis of the alewife is parallel to the plane of polarization of the incident light beam before recording a Raman spectrum. FIG. 4 shows an optical micrograph of single-wall carbon nanotube alewives with the center alewife aligned in the cross hairs in order to take the Raman spectra. Raman spectra are then recorded at four different positions along the length of the aggregate. The sample is then rotated to position the aggregate perpendicular to the plane of polarization. Again, Raman spectra are recorded at four positions along the length. Measurements are taken on at least four different alewives and averaged.

Figure 5:
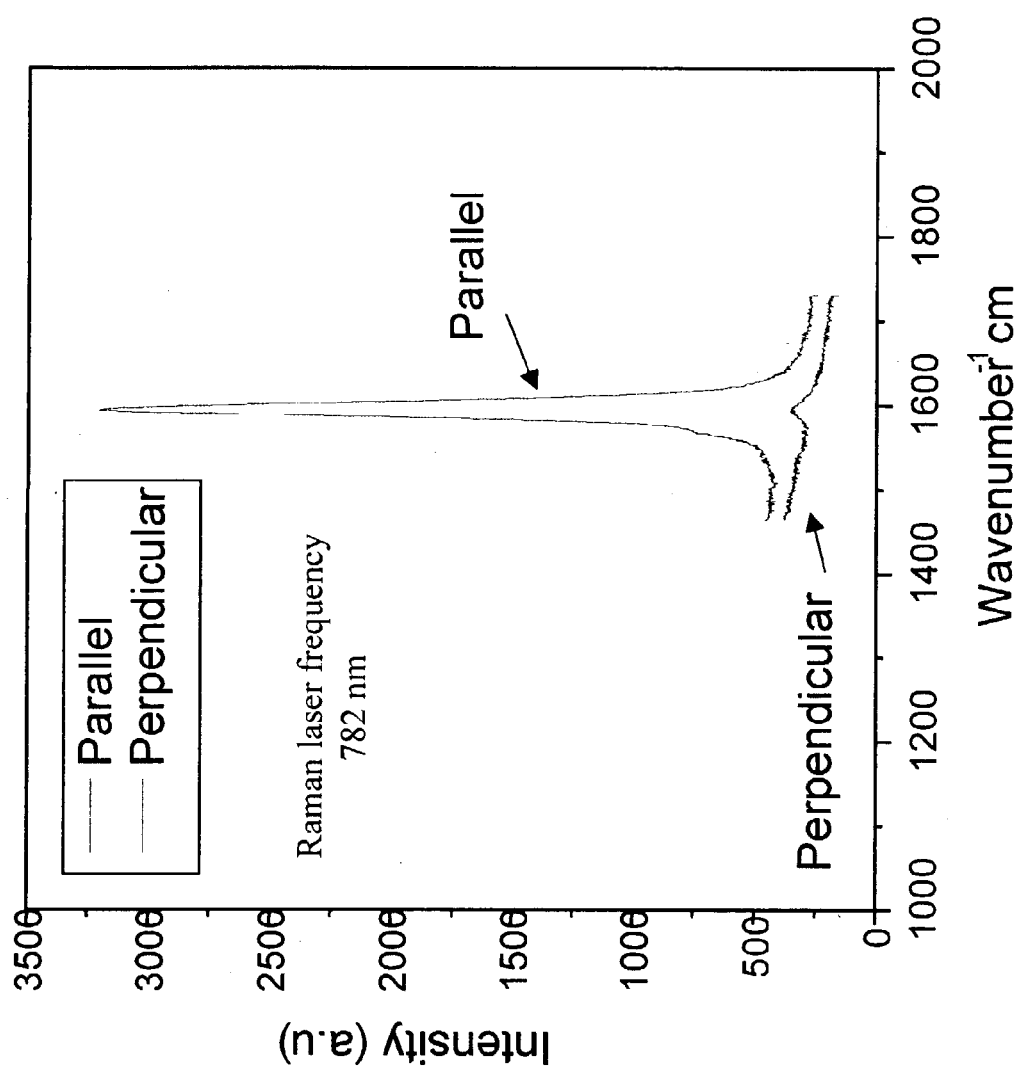
FIG. 5 shows a Raman spectra taken with the Raman laser polarization vector parallel and perpendicular to the long axis of a single-wall carbon nanotube alewife.

FIG. 5 shows typical Raman spectra of an alewife aggregate recorded at the parallel and perpendicular modes. The ratio of the average intensity of the peak at 1593 cm$^{-1}$ between the parallel and perpendicular modes was separately calculated for each aggregate. The internal alignment of single-wall carbon nanotubes within alewives, obtained from a 4 wt % single-wall carbon nanotube/oleum/water mixture, was examined. The average alignment ratio, $R_{ave}$, obtained by averaging the ratios for four different aggregates, was found to be 14.9±1.78 σ (stnd. dev.) A Fraser fraction f value of 0.73 was obtained, indicating a high degree of internal alignment of the single-wall carbon nanotubes in the alewives. A Fraser fraction f value of at least about 0.25 is preferred for aligned nanotubes. A Fraser fraction of at least about 0.5 is more preferred. A Fraser fraction of at least about 0.7 is most preferred.

The internal alignment of the single-wall carbon nanotubes occurs spontaneously even at high nanotube concentrations only in strong, moisture-free, protonating environments such as 100% sulfuric acid and superacids. Neither alewives nor super ropes are formed using in 98% sulfuric acid.

However, single-wall carbon nanotubes can be intercalated with various chemicals so as to promote dispersion of the nanotubes. Intercalating species include chemicals such as concentrated nitric acid, concentrated sulfuric acid, 100% sulfuric acid, oleum, mixtures of polyphosphoric acid and oleum, fluorosulfuric acid, chlorosulfuric acid, and sulfonic acids (fluorosulfonic, chlorosulfonic, alkyl and aromatic sulfonic and perchloro and perfluoro alkyl and aromatic sulfonic acids), molten metal halides, hydrogen fluoride and the elemental halogens (chlorine, fluorine, bromine and iodine), mixtures of metal halides with hydrogen fluoride and mixtures of elemental halogens with hydrogen fluoride.

If no redispersing of the nanotubes is desired, the preferred intercalating species is one that does not redisperse the individual nanotubes, "an aggregate non-redispersing species" or, alternatively for acids, "an aggregate non-redispersing acid." If substantial redispersibility of the single-wall carbon nanotubes is desired, the preferred intercalating species is one that substantially redisperses the nanotubes, "an aggregate substantially redispersing species" or, alternatively for acids, "an aggregate substantially redispersing acid." If redispersion of the nanotubes is desired, the preferred intercalating species is one that redisperses the individual nanotubes, "an aggregate redispersing species" or, alternatively for acids, "an aggregate redispersing acid."

In other words, if alewives are desired that will not redisperse in an acid to individual single-wall carbon nanotubes, an aggregate non-redispersing acid can be used. If alewives or super ropes are desired that will substantially redisperse in an acid to individual single-wall carbon nanotubes, an aggregate substantially redispersing acid can be used. And, if alewives or super ropes are desired that will redisperse in an acid to individual single-wall carbon nanotubes, an aggregate redispersing acid can be used.

Intercalated single-wall carbon nanotubes promote the dispersion of single-wall carbon nanotubes and are a starting material for dispersing the nanotubes in liquids, polymeric materials, ceramics and other solids. Single-wall carbon nanotubes that are intercalated with sulfuric acid readily disperse in water that contains small amount of a surfactant. The rapid dispersion of sulfuric acid-intercalated single-wall carbon nanotubes can occur in other liquids, such as dimethyl formamide, chloroform, and dichlorobenzene. The single-wall carbon nanotubes may be intercalated by soaking the nanotubes in neat intercalating liquids or exposing single-wall carbon nanotubes to gaseous intercalating species, with or without heating. Besides enhancing dispersion, intercalation of certain chemical species provides a means for preparing single-wall carbon nanotube alewives, super ropes and fibers. The super ropes of single-wall carbon nanotubes have a diameter of about one-half micron to about 2 microns.

Although not meant to be bound by theory, in the presence of 100% sulfuric acid or superacid, the acid species intercalate the individual nanotubes and nanotube bundles. In the case of oleum, for example, the nanotubes are intercalated with $H_2SO_4$ and $HSO_3^-$ ions, and are expected to carry a positive charge from protonation. With a positive charge on the intercalated individual single-wall carbon nanotubes or nanotube bundles, the intercalated species induce Coulombic repulsive forces which are stronger than the attractive van der Waals forces, so as to permit the individual tubes and bundles to slide past each other and form locally ordered liquid crystal-like domains. When the water is slowly introduced, controlled hydrolysis is followed by slow aggregation of the nanotubes into monodisperse alewives. These aggregates, once formed, are morphologically stable to thermal annealing under inert atmosphere and reduction in a hydrogen atmosphere.

Alewives and fibers of highly aligned single-wall carbon nanotubes of this invention provide a fundamental improvement in products and articles of manufacture that rely on dispersed, aligned single-wall carbon nanotubes. Some of the articles of manufacture include, but are not limited to, composite materials with electrical, mechanical, electromagnetic or chemical properties derived in part from the single-wall carbon nanotubes contained therein. The dispersion of aligned single-wall carbon nanotubes in the form of alewives provided by this invention can enable better properties for applications such as electromagnetic interference (EMI) and radiofrequency interference (RFI) shielding. Other articles of manufacture include electrodes of fuel cells, capacitors or batteries, particularly lithium-ion batteries; catalyst supports, structure-modifying additives for vehicle tires and laminated composites, including high-strength carbon fiber composites, anti-corrosion and other electrochemical materials and coatings; fibers containing or comprised entirely of single-wall carbon nanotubes, chemical, physical, and electronic sensors; films and coatings; inks and conducting materials that may be printed in any way; electrically and thermally conductive coatings, electrically and thermally conductive composite materials, electromagnetic and radio-frequency shielding materials; field emission cathodes; biologically-compatible coatings, objects and devices that are inserted or implanted into living organisms; radar-absorbing materials, optically-active materials and devices; components of systems that convert sunlight to electrical energy; electronic devices including transistors, pass elements, capacitors, inductors, resistors, connectors, switches, wires, interconnections devices and antennae at frequencies up to and including optical frequencies; electronic circuit fabrication materials; electrical and thermal conducting materials, transducers, electrical transmission cable, high-strength fiber, and structural elements of machines, buildings, vehicles, and airframes, components for aircraft, components for missiles, vehicle bodies, bulletproof vests, armor, and ship hulls. Other articles of manufacture improved by the incorporation of single-wall carbon nanotube alewives and fibers include skis, surfboards, sails, racquets, other sporting goods, and woven material, woven with other single-wall carbon nanotube fibers, natural fibers or synthetic fibers.

The fundamental improvements enabled by single-wall carbon nanotubes in the foregoing applications are due to the ability to provide aligned single-wall carbon nanotubes that can be easily handled and dispersed as alewives in the host material. This enhanced dispersion, can permit use of lower loadings of single-wall carbon nanotubes in some applications, so as to retain the desirable properties of the host material, while simultaneously providing enhanced electrical, thermal or tensile properties of the single-wall carbon nanotubes for the particular applications. Improvements in the applications using fibers of single-wall carbon nanotubes are improved by the coordinated alignment of the single-wall carbon nanotubes into impart strength and provide for higher strength materials.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLES

Example 1

This example demonstrates the preparation and grinding of purified single-wall carbon nanotubes.

Single-wall carbon nanotubes (HiPco™ single-wall carbon nanotubes obtained from Carbon Nanotechnologies, Inc., Houston, Tex.) were purified to remove residual iron metal catalyst particles and amorphous carbonaceous impurities. The purification included a gas-phase oxidation and an aqueous hydrochloric acid treatment. After a hydrochloric acid treatment, the nanotubes were filtered in a Buchner funnel and washed with a continuous and slow stream of deionized water until the filtrate was neutral. After water washing, the purified single-wall carbon nanotubes were washed repeatedly with methanol, filtered and dried in a rotary evaporator.

Thermogravimetric analysis (TGA) of the dried, purified single-wall carbon nanotubes in air indicated that the remaining iron impurity was less than 0.8 atom %. The dried single-wall carbon nanotubes were ground manually with a mortar and pestle until uniform to sub-millimeter level to form a single-wall carbon nanotube powder.

Example 2

This example demonstrates the preparation of a single-wall carbon nanotube/oleum mixture.

Using ground single-wall carbon nanotube powder, as prepared in Example 1, a mixture of 4 wt % single-wall carbon nanotubes in oleum ($H_2SO_4$:20% $SO_3$) was prepared by mixing using a sealed propeller mixer at 130° C. for 12 hours under an inert argon atmosphere.

No distinct single-wall carbon nanotube alewife aggregates were observed in the 4 wt % single-wall carbon nanotube/oleum mixture. The single-wall carbon nanotube formations consisted of thicker, non-uniform ropes of single-wall carbon nanotubes, approximately 200 to 400 nm in thickness and randomly entangled as a mat.

Example 3

This example demonstrates that single-wall carbon nanotube alewives are not formed in an anhydrous system, such as dry ether.

0.5 cc of the 4 wt % single-wall carbon nanotube/oleum mixture, prepared in Example 2, was put into about 200 mls of dry ether, followed by stirring and sonication. The resulting single-wall carbon nanotube/dry ether suspension was filtered through a 0.2 micron PTFE filter. The single-wall carbon nanotubes recovered from the filter formed a bucky paper which was peeled off and vacuum dried. No carbon alewives were observed using the procedures of this example.

Example 4

This example demonstrates the preparation of single-wall carbon nanotube alewives.

Moisture was introduced to the 4 wt % single-wall carbon nanotube/oleum mixture, prepared in Example 2, by stirring overnight at 90° C. in an atmosphere of ambient air. The resulting single-wall carbon nanotube/oleum/water mixture was then transferred to a glass syringe. About 5 cc of this mixture was injected into about 200 mls of dry ether in a conical flask. The ether suspension was sonicated in a bath sonicator and filtered through a PTFE filter. The remaining solid was washed with methanol, vacuum dried at room temperature, and collected as a powder. A scanning electron micrograph showed the formation of alewives. With sonication, the alewives are readily dispersible as individual aggregates in surfactant-assisted suspensions. A typical surfactant that can be used to disperse the aggregates is sodium dodecyl benzene sulfonate. Other surfactants that can be used include sodium dodecyl sulfate and Triton X-100™. (Triton X-100 was a registered trademark formerly owned by Rohm and Haas Co., but now owned by Union Carbide.)

The thermal stability of the carbon alewives was tested by TGA under argon flowing at 100 cc/min. A sample of alewives was heated at a rate of 20° C./min under vacuum to 800° C. and held isothermally for one hour. The evolved gases were analyzed by infrared (IR) and mass-spectrometry (MS) and revealed the evolution of primarily $SO_3$ at temperatures less than 200° C., primarily $SO_2$, with a small amount of $CO_2$, in the temperature range of about 200° C. to about 450° C., and primarily $CO_2$ and water above 450° C. Approximately 13% of the total weight loss in the alewives could be attributed to sulfur-containing species.

Example 5

This example demonstrates the preparation of carbon alewives from a 4 wt % single-wall carbon nanotube/oleum/water mixture.

A sample of the 4 wt % single-wall carbon nanotube/oleum/water mixture, prepared according to Example 4 but before drying, was taken by glass syringe and introduced dropwise into the ether layer of a diethyl ether/water bilayer in a 100-ml glass beaker. A thin film of single-wall carbon nanotube/oleum/water mixture formed immediately and floated at the ether/water interface. The film was collected on a stub of flat aluminum by carefully lowering the stub through the interface and slowly raising it from beneath the single-wall carbon nanotube/oleum/water film.

Carbon alewives were collected at the ether/water interface on the aluminum stub and were approximately 10–15 microns long and 1–2 microns thick, as determined by scanning electron microscopy. Raman spectroscopy showed high internal nanotube alignment within the distinct aggregates.

Example 6

This example demonstrates the preparation of carbon alewives from a 0.25 wt % single-wall carbon nanotube/oleum/water mixture.

The same experiments of Examples 4 and 5 were done except that the starting material was a 0.25 wt % single-wall carbon nanotube/oleum/water mixture. The alewives were approximately 12 microns long and up to about a half micron wide and had a similar shape as those formed from the 4 wt % single-wall carbon nanotube/oleum/water mixture.

Example 7

This example demonstrates the preparation of carbon alewives from a 1 wt % single-wall carbon nanotube/oleum/water mixture.

The same experiments of Examples 4 and 5 were done except that the starting material was a 1 wt % single-wall carbon nanotube/oleum/water mixture. The alewives formed using the 1% single-wall carbon nanotube/oleum/water mixture were similar in size and shape to those formed from the 0.25 wt % single-wall carbon nanotube/oleum/water mixture.

Example 8

This example demonstrates that alewives are not formed in 98% $H_2SO_4$.

The same experiments of Examples 4 and 5 were done except that the starting material was a mixture of 1 wt % single-wall carbon nanotubes in 98% sulfuric acid. The product was collected in ether, washed and recovered as a bucky paper. A bucky paper is a thin mat of entangled single-wall carbon nanotubes and single-wall carbon nanotube ropes. No alewives were observed. The ropes observed in this sample had uniform thicknesses from about 20 nm to about 30 nm. At lower magnifications, the morphology resembled a continuous sheet of crumpled paper.

Example 9

This example demonstrates the preparation of fibers of aligned single-wall carbon nanotubes extruded from a mixture of single-wall carbon nanotubes and 100% sulfuric acid.

Single-wall carbon nanotubes (HiPco™ single-wall carbon nanotubes obtained from Carbon Nanotechnologies, Inc., Houston, Tex.) were purified. A 6 wt % mixture of the purified single-wall carbon nanotubes in 100% sulfuric acid was prepared. The mixture was heated at 110° C. and mixed under an argon atmosphere for 72 hours. The argon pressure was kept slightly greater than atmospheric to provide a positive pressure within the vessel. A water-cooled condenser was used to prevent the loss of sulfur trioxide.

Under an inert argon atmosphere, approximately 5 mls of the mixture was removed using a stainless steel syringe. While still under an inert argon atmosphere, the syringe was secured to a syringe pump, mounted vertically over a coagulation column. Fiber samples were extruded through stainless steel dies of varying lengths in the range of 1 inch and 4 inches and having orifices with diameters of 500 microns, 250 microns and 125 microns. The extrusion was done into different coagulants without exposing the nanotube mixture to an air gap. The coagulants included diethyl ether, 10% $H_2SO_4$(aq), ethylene glycol-diethyl ether and 10% $H_2SO_4$(aq) followed by diethyl ether. Fibers of at least 10 cm in length were extruded for subsequent testing and characterization. Tension was not applied during extrusion. The fibers were removed from the coagulant bath and allowed to dry in air without any applied tension.

The fibers were analyzed by Raman spectroscopy to determine the degree of internal alignment of the single-wall carbon nanotubes. The ratio of the Raman intensity of the $E_{2g}$ mode at 1593 cm$^{-1}$ using a linearly polarized laser beam from a 780-nm diode laser was determined from spectra taken for parallel and perpendicular orientations to the axis of each fiber. Five data points for each orientation were recorded. A Chauvenet's Criterion of ½ was used for analyzing the "reasonableness" of data points. Table 1 lists the Polarized Raman Ratio, R, using the mean parallel and perpendicular intensities and the standard deviation of the mean. The Fraser fraction, f, an indication of the nanotube alignment, was also calculated. See Table 1 below.

TABLE 1

| Orifice Diameter | Tube Length | Coagulant | Polarized Raman Ratio, R | Fraser Fraction f |
|---|---|---|---|---|
| 500 μm | 1" | Diethyl Ether | 15 ± 3.8 | 0.74 |
| 500 μm | 2" | Diethyl Ether | 9 ± 2 | 0.62 |
| 500 μm | 3" | Diethyl Ether | 11 ± 5.4 | 0.67 |
| 500 μm | 4" | Diethyl Ether | 11 ± 4.6 | 0.67 |
| 250 μm | 2" | Diethyl Ether | 14 ± 2.3 | 0.72 |
| 125 μm | 2" | Diethyl Ether | 22 ± 2.5 | 0.81 |
| 125 μm | 4" | Diethyl Ether | 21 ± 2.6 | 0.80 |
| 125 μm | 2" | 10% $H_2SO_4$ in Water | 8 ± 1.7 | 0.58 |
| 125 μm | 2" | Ethylene Glycol Diethyl Ether | 5 ± 2.2 | 0.44 |
| 125 μm | 2" | 10% $H_2SO_4$ in Water, then Diethyl Ether | 14 ± 3.4 | 0.72 |

Figure 6:
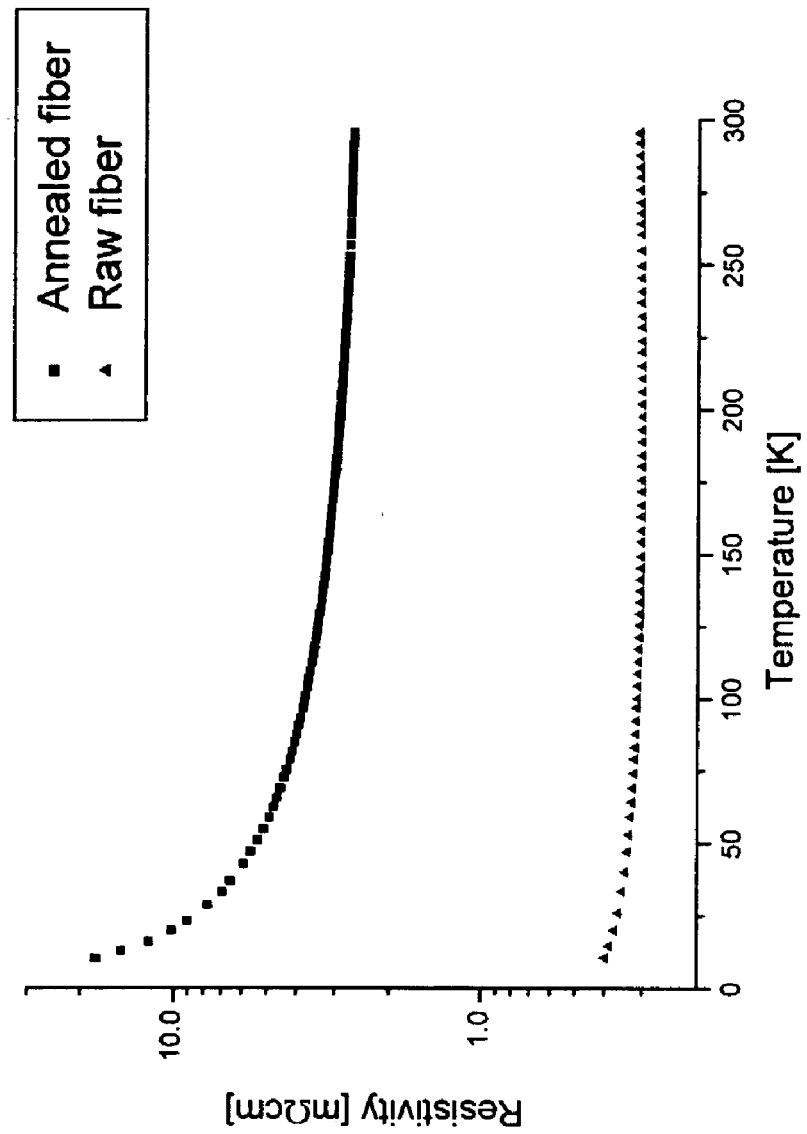
FIG. 6 shows a plot of resistivity as a function of temperature for raw and annealed fibers extruded from a 6 wt % single-wall carbon nanotube/100% sulfuric acid mixture.

Four point resistivity measurements as a function of temperature were performed on the fibers extruded from 6 wt % single-wall carbon nanotube/100% $H_2SO_4$ through the 125 μm diameter, 2" long die into diethyl ether. The fiber sample was also annealed under vacuum at 1420° K for 2 hours and the resistivity measurements repeated. FIG. 6 shows the resistivity data as a function of temperature for the raw and annealed fibers. Resistivity at 200° K for the annealed and raw fiber samples was 2.89 mΩ·cm and 0.30 mΩ·cm, respectively.

Figure 7:
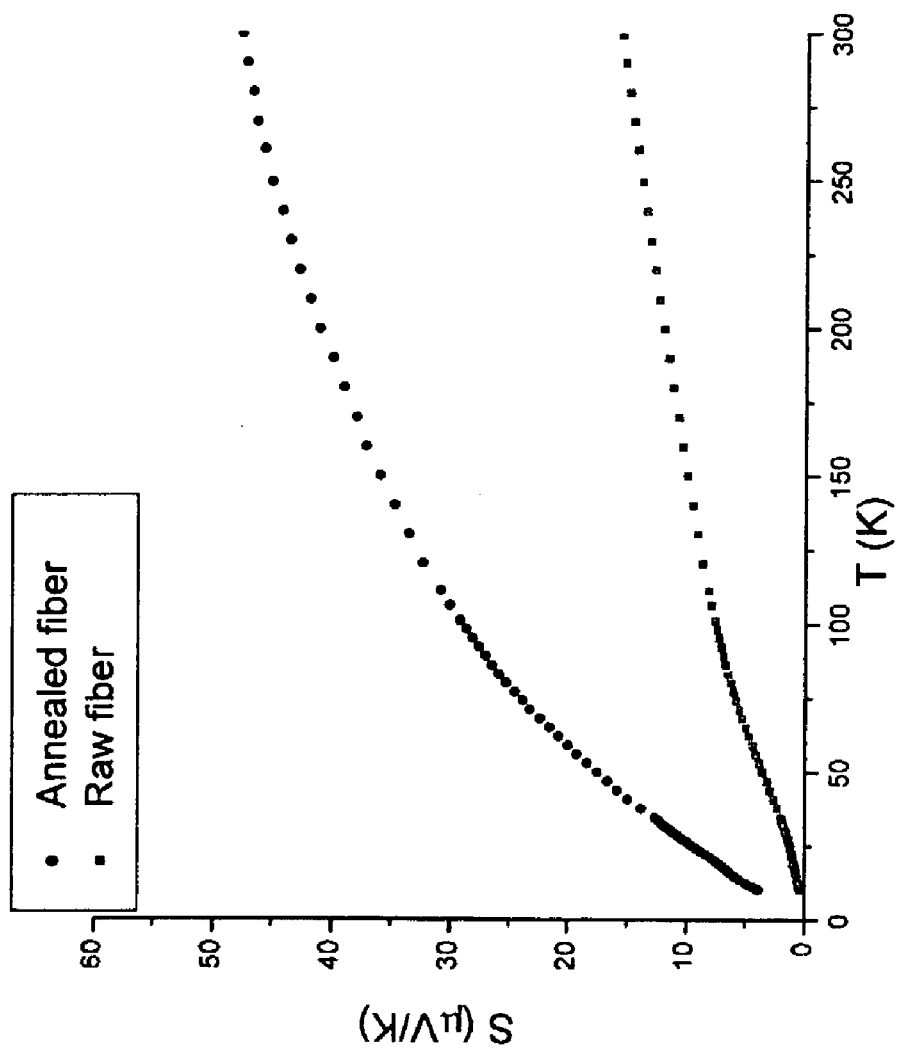
FIG. 7 shows a plot of thermopower as a function of temperature for raw and annealed fibers extruded from a 6 wt % single-wall carbon nanotube/100% sulfuric acid mixture.

Thermopower measurements were performed on the same raw and annealed fibers extruded from a 6 wt % single-wall carbon nanotube/100% $H_2SO_4$ mixture through a 125 μm diameter, 2" long die into diethyl ether. FIG. 7 shows thermopower as a function of temperature. Thermopower at 200° K for the annealed and raw fiber samples was 41.05 μV/K and 12.02 μV/K, respectively.

Figure 8:
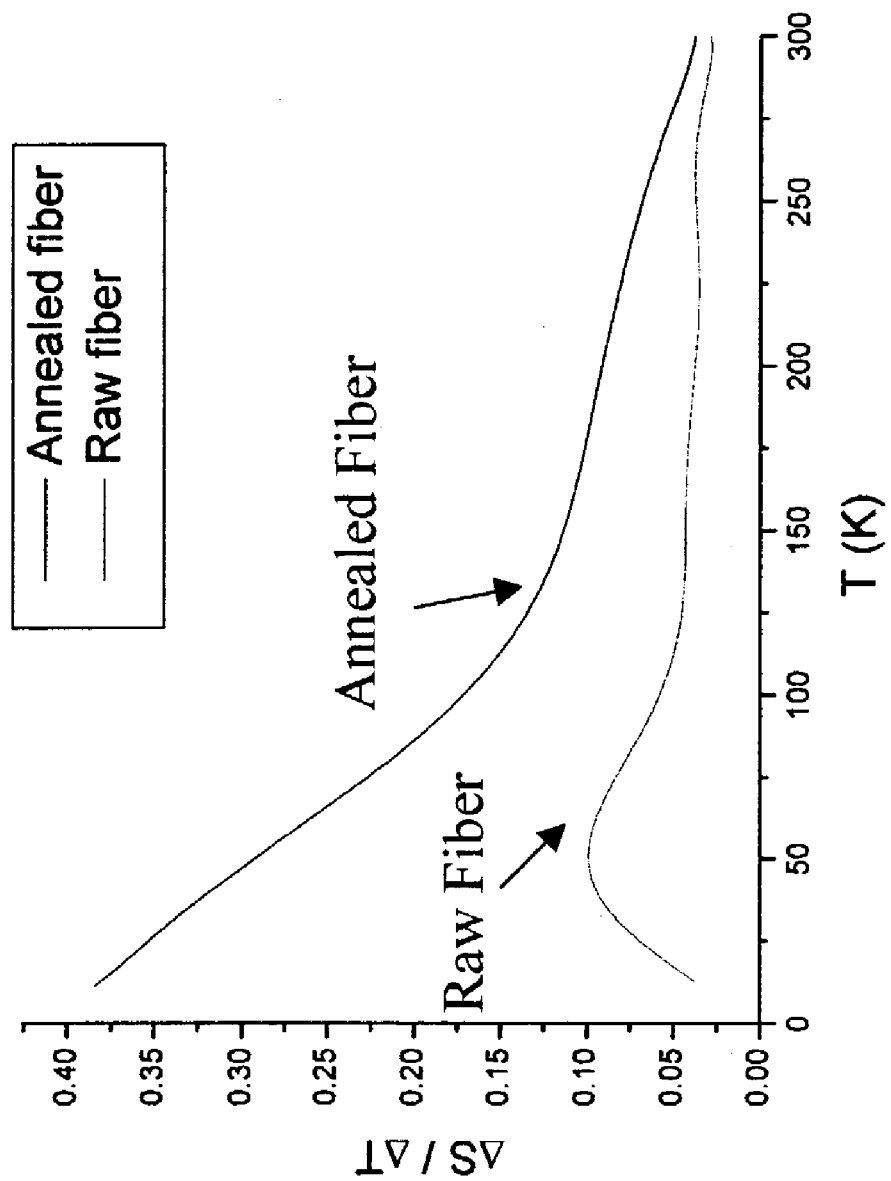
FIG. 8 shows a plot of differential thermopower as a function of temperature for raw and annealed fibers extruded from a 6 wt % single-wall carbon nanotube/100% sulfuric acid mixture.

Differential thermopower as a function of temperature was determined for the same raw and annealed fibers extruded from a 6 wt % single-wall carbon nanotube/100% $H_2SO_4$ mixture through a 125 μm diameter, 2" long die into diethyl ether. FIG. 8 shows differential thermopower as a function of temperature. Differential thermopower at 200° K for the annealed and raw fiber samples was 0.092 μV/K$^2$ and 0.038 μV/K$^2$, respectively.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. A method of making a fiber of aligned single-wall carbon nanotubes, comprising:
   (a) mixing single-wall carbon nanotubes with a superacid selected from the group consisting of:
      (i) a Brønsted superacid selected from the group consisting of perchloric acid, chlorosulfuric acid, fluorosulfuric acid, chlorosulfonic acid, fluorosulfonic acid, perfluoroalkanesulfonic acid, trifluoromethanesulfonic acid, higher perfluoroalkanesulfonic acid, $C_2F_5SO_3H$, $C_4F_9SO_3H$, $C_5F_{11}SO_3H$, $C_6F_{13}SO_3H$, $C_8F_{17}SO_3H$,

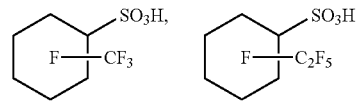

and α, ω-perfluoroalkanedisulfonic acid,
      (ii) a Lewis superacid selected from the group consisting of antimony pentafluoride, arsenic pentafluoride, tantalum pentafluoride and niobium pentafluoride, and
      (iii) a Brønsted-Lewis conjugate superacid selected from the group consisting of polyphosphoric acid-oleum mixtures, tetra(hydrogen sulfato)boric acid-sulfuric acid, fluorosulfuric acid-antimony pentafluoride, fluorosulfuric acid-sulfur trioxide, fluorosulfuric acid-arsenic pentafluoride, $HSO_3F$:$HF$:$SbF_5$, $HSO_3F$:$SbF_5$:$SO_3$, a perfluoroalkanesulfonic acid-based system, $C_nF_{2n+1}SO_3H$:$SbF_5$, where n=1, 2 or 4, $CF_3SO_3H:B(SO_3CF_3)_3$, hydrogen-flouride-antimony pentafluoride, hydrogen fluoride-tantalum pentafluoride, hydrogen fluoride-boron trifluoride, a cojugate Friedel-Crafts acid, HBr:$AlBr_3$, and HCl:$AlCl_3$; to form a single-wall carbon nanotube/acid mixture, and (b) spinning the single-wall carbon nanotube/acid mixture to form a fiber.

2. The method of claim 1, wherein the single-wall carbon nanotubes are at a concentration range between about 0.01 wt % and about 10 wt % in the acid.

3. The method of claim 1, wherein the single-wall carbon nanotubes are at a concentration range between about 4 wt % and about 10 wt % in the acid.

4. The method of claim 1, wherein the single-wall carbon nanotubes are at a concentration range between about 6 wt % and about 8 wt % in the acid.

5. The method of claim 1, wherein the mixing step is done in a time range between about 3 hours and about 3 days.

6. The method of claim 1, wherein the spinning step comprises wet spinning into a coagulant.

7. The method of claim 1, wherein the aligned single-wall carbon nanotubes in the fiber have a Fraser fraction of at least about 0.25.

8. The method of claim 1, wherein the aligned single-wall carbon nanotubes in the fiber have a Fraser fraction of at least about 0.5.

9. The method of claim 1, wherein the aligned single-wall carbon nanotubes in the fiber have a Fraser fraction of at least about 0.7.

10. The method of claim 1, further comprising washing the fiber.

11. The method of claim 10, wherein the washing is done in a liquid selected from the group consisting of water, diethyl ether, methanol and combinations thereof.

12. The method of claim 1, further comprising drying the fiber.

13. The method of claim 12, wherein the drying is done by a method selected from the group consisting of heating, air drying, vacuum drying and a combination thereof.

14. The method of claim 1, wherein the mixing step is done under an inert atmosphere.

15. The method of claim 1, wherein the mixing step is done at a temperature range between about room temperature and about 150° C.

16. The method of claim 6, wherein the coagulant is selected from the group consisting of water, diethyl ether, 10% sulfuric acid, ethylene glycol and mixtures thereof.

17. The method of claim 1, wherein the superacid is trifluoromethanesulfonic acid.

18. The method of claim 1, further comprising annealing the fiber.

19. The method of claim 18, wherein the annealing is done at a temperature in the range between about 400° C. and about 800° C.

20. The method of claim 1 further comprising subjecting the fiber to a reducing environment at an elevated temperature.

21. The method of claim 20, wherein the temperature is up to about 450° C.

22. A method of making a fiber of aligned single-wall carbon nanotubes, comprising:
(a) mixing single-wall carbon nanotubes with an anhydrous acid selected from the group consisting of 100% sulfuric acid and a superacid to form a single-wall carbon nanotube/acid mixture, wherein the superacid is trifluoromethanesulfonic acid, and (b) spinning the single-wall carbon nanotube/acid mixture to form a fiber.

23. A method of making a fiber of aligned single-wall carbon nanotubes, comprising:
(a) mixing single-wall carbon nanotubes with an anhydrous acid selected from the group consisting of 100% sulfuric acid and a superacid to form a single-wall carbon nanotube/acid mixture, and
(b) spinning the single-wall carbon nanotube/acid mixture to form a fiber, wherein the spinning step comprises wet spinning into a coagulant and wherein the coagulant is selected from the group consisting of water, diethyl ether, 10% sulfuric acid, ethylene glycol and mixtures thereof.

24. A method of making a fiber of aligned single-wall carbon nanotubes, comprising:
(a) mixing single-wall carbon nanotubes with an anhydrous acid selected from the group consisting of 100% sulfuric acid and a superacid to form a single-wall carbon nanotube/acid mixture, and
(b) spinning the single-wall carbon nanotube/acid mixture to form a fiber, and
(c) annealing the fiber.

25. The method of claim 24, wherein the annealing is done at a temperature in the range between about 400° C. and about 800° C.

26. A method of making a fiber of aligned single-wall carbon nanotubes, comprising:
(a) mixing single-wall carbon nanotubes with an anhydrous acid selected from the group consisting of 100% sulfuric acid and a superacid to form a single-wall carbon nanotube/acid mixture,
(b) spinning the single-wall carbon nanotube/acid mixture to form a fiber, and
(c) subjecting the fiber to a reducing environment at an elevated temperature.

27. The method of claim 26, wherein the temperature is up to about 450° C.

28. A method for forming intercalated single-wall carbon nanotubes, comprising:
mixing single-wall carbon nanotubes with a superacid selected from the group consisting of
(a) a Brønsted superacid selected from the group consisting of perchloric acid, chlorosulfuric acid, fluorosulfuric acid, chlorosulfonic acid, fluorosulfonic acid, perfluoroalkanesulfonic acid, trifluoromethanesulfonic acid, higher perfluoroalkanesulfonic acid, $C_2F_5SO_3H$, $C_4F_9SO_3H$, $C_5F_{11}SO_3H$, $C_6F_{13}SO_3H$, $C_8F_{17}SO_3H$,

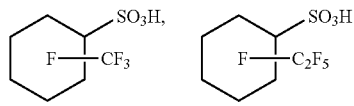

and α, ω-perfluoroalkanedisulfonic acid,
(b) a Lewis superacid selected from the group consisting of antimony pentafluoride, arsenic pentafluoride, tantalum pentafluoride and niobium pentafluoride, and
(c) a Brønsted-Lewis conjugate superacid selected from the group consisting of polyphosphoric acid-oleum mixtures, tetra(hydrogen sulfato)boric acid-sulfuric acid, fluorosulfuric acid-antimony pentafluoride, fluorosulfuric acid-sulfur trioxide, fluorosulfuric acid-arsenic pentafluoride, $HSO_3F:HF:SbF_5$, $HSO_3F:SbF_5$:$SO_3$, a perfluoroalkanesulfonic acid-based system, $C_nF_{2n+1}SO_3H{:}SbF_5$, where n=1, 2 or 4, $CF_3SO_3H{:}B(SO_3CF_3)_3$, hydrogen-fluoride-antimony pentafluoride, hydrogen fluoride-tantalum pentafluoride, hydrogen fluoride-boron trifluoride, a conjugate Friedel-Crafts acid, $HBr{:}AlBr_3$, and $HCl{:}AlCl_3$; under an inert atmosphere at a temperature ranging from about room temperature to about 150° C. for a time sufficient to form a single-wall carbon nanotube/acid mixture.

29. The method of claim 28, wherein the single-wall carbon nanotubes are at a concentration range between about 0.01 wt % and about 10 wt % in the acid.

30. The method of claim 28, wherein the superacid is an aggregate redispersing acid.

31. The method of claim 28, wherein the intercalated single-wall carbon nanotubes form super ropes.

32. The method of claim 28, wherein the superacid is an aggregate redispersible acid.

33. The method of claim 28, wherein the intercalated single-wall carbon nanotubes form super ropes.

34. The method of claim 33, wherein the super ropes have a diameter in the range between about one-half micron and about 2 microns.

* * * * *